United States Patent
Tsujimura et al.

(10) Patent No.: US 8,784,262 B2
(45) Date of Patent: Jul. 22, 2014

(54) VEHICULAR POWER TRANSMISSION CONTROL APPARATUS

(75) Inventors: Manabu Tsujimura, Nishio (JP); Takeshige Miyazaki, Chiryu (JP); Mitsutoshi Kamiya, Nishio (JP)

(73) Assignees: Aisin AI Co., Ltd., Nishio-Shi (JP); Aisin Seiki Kabushiki Kaisha, Kariya-Shi (JP)

( * ) Notice: Subject to any disclaimer, the term of this patent is extended or adjusted under 35 U.S.C. 154(b) by 0 days.

(21) Appl. No.: 13/194,128

(22) Filed: Jul. 29, 2011

(65) Prior Publication Data

US 2012/0028759 A1    Feb. 2, 2012

(30) Foreign Application Priority Data

Aug. 2, 2010   (JP) .................................. 2010-173697

(51) Int. Cl.
  *B60W 10/02*   (2006.01)
  *B60W 10/08*   (2006.01)
(52) U.S. Cl.
  USPC ............................................................. 477/5
(58) Field of Classification Search
  None
  See application file for complete search history.

(56) References Cited

U.S. PATENT DOCUMENTS

| | | | |
|---|---|---|---|
| 7,744,502 B2* | 6/2010 | Dreibholz et al. | 477/5 |
| 2002/0134637 A1* | 9/2002 | Salecker et al. | 192/54.1 |
| 2004/0185985 A1* | 9/2004 | Inoue | 477/70 |
| 2004/0260444 A1 | 12/2004 | Winkelmann et al. | |
| 2007/0259755 A1* | 11/2007 | Tanishima | 477/3 |
| 2008/0032855 A1* | 2/2008 | Sah et al. | 477/3 |

FOREIGN PATENT DOCUMENTS

| | | |
|---|---|---|
| DE | 197 25 816 A1 | 1/1998 |
| EP | 1 460 317 A2 | 9/2004 |
| EP | 1 640 234 B1 | 5/2010 |
| JP | 03-200429 A | 9/1991 |
| JP | 08-054031 | 2/1996 |
| JP | 2006-097740 A1 | 4/2006 |
| JP | 2008-180391 A | 8/2008 |

* cited by examiner

*Primary Examiner* — Justin Holmes
(74) *Attorney, Agent, or Firm* — Burr & Brown, PLLC

(57) ABSTRACT

A vehicular power transmission control apparatus including: a multiple gear ratio transmission including an input shaft receiving power from an engine output shaft and an output shaft outputting power to drive wheels of a vehicle, a clutch mounted between the output shaft of the engine and the input shaft of the transmission, and a control unit controlling a clutch torque and a gear position of the transmission based upon a vehicle driving condition, wherein the control unit controlling the clutch torque such that a revolution speed of the transmission input shaft becomes smaller than a revolution speed of the engine output shaft by a predetermined positive value in a semi-engagement state with a slip, when the vehicle drives with the transmission gear position set to a low speed range including a first gear and a second gear.

9 Claims, 6 Drawing Sheets

VEHICULAR POWER TRANSMISSION CONTROL APPARATUS

BACKGROUND OF THE INVENTION

1. Field of the Invention

The present invention relates to a vehicular power transmission control apparatus.

2. Description of the Related Art

Recently, a power transmission control apparatus has been developed, which includes a multiple gear ratio transmission having plural gear positions and having no torque converter; a clutch that is provided between an output shaft of an internal combustion engine and an input shaft of the multiple gear ratio transmission and that can adjust a clutch torque (the maximum torque that the clutch can transmit); and a control unit that controls the clutch torque and the gear position of the multiple gear ratio transmission by using an actuator according to a driving condition of a vehicle (see, for example, Japanese Unexamined Patent Application Publication No. 2006-97740). The power transmission control apparatus described above is also referred to as an automated manual transmission (AMT).

During the shift operation (the operation of changing the gear position of the transmission) in the vehicle having the AMT mounted thereto, the clutch is changed from an engagement state (clutch torque>0) to a disengagement state (clutch torque=0) due to the operation of the actuator before the start of the shift operation, whereby the shift operation is performed due to the operation of the actuator with the clutch being kept to be disengaged, and after the completion of the shift operation, the clutch is returned to the engagement state from the disengagement state due to the operation of the actuator.

SUMMARY OF THE INVENTION

When the vehicle having the AMT mounted thereto runs with the state in which the gear position of the transmission is fixed to a certain gear position (with the state in which the shift operation is not performed), the clutch torque of the clutch is generally controlled in order that the state in which the slip is not caused on the clutch can be obtained (totally engagement state), i.e., the revolution speed of the input shaft of the transmission agrees with the revolution speed of the output shaft of the internal combustion engine.

It is supposed below the case where the vehicle runs with the state in which the gear position of the transmission is set to a gear position at a lower speed range (typically, a first speed), which has a large speed reducing ratio, and the clutch is in the totally engagement state. In this case, when a driver sharply decreases (especially, decreases to zero) an operation amount (acceleration pedal opening degree) of an acceleration operating member from a large value, a torsional vibration having relatively a large amplitude is liable to generate on a drive system of the vehicle. This is considered to be based upon the reason described below.

Specifically, when the gear position of the transmission is set to the gear position at the lower speed range (typically, a first speed) having a large speed reducing ratio, the drive torque of the internal combustion engine inputted to the input shaft of the transmission through the clutch is greatly amplified in the transmission, and then, transmitted to the output shaft of the transmission. Accordingly, when the acceleration pedal opening degree (accordingly, the drive torque of the internal combustion engine) is adjusted to be a great value in this case, a large drive torque is exerted on the "drive system between the output shaft of the transmission and a drive wheel". Therefore, a great torsion is generated on a propeller shaft or the like constituting the "drive system between the output shaft of the transmission and the drive wheel".

When the acceleration pedal opening degree is sharply decreased with this state, the drive torque of the internal combustion engine sharply decreases. With this, the drive torque inputted to the input shaft of the transmission through the clutch also sharply decreases. Therefore, the drive torque exerted on "the drive system between the output shaft of the transmission and the drive wheel" sharply decreases. As a result, the great torsion generated on the propeller shaft is abruptly released. Due to the abrupt release of the great torsion, the torsional vibration is liable to generate on the propeller shaft or the like. With the torsional vibration, the torsional vibration is generated on the vehicle drive system.

When the clutch is kept in the total engagement state and the torsional vibration is generated on the drive system as described above, the slip is not caused on the clutch, resulting in that an action (damping action) of suppressing the torsional vibration due to the slip on the clutch is not exerted. Therefore, the torsional vibration having relatively great amplitude is liable to be generated on the vehicle drive system. It has been desired to suppress the generation of the torsional vibration having relatively great amplitude on the vehicle drive system.

The present invention aims to provide a vehicular power transmission control apparatus adapted to a vehicle having an AMT mounted thereto, the apparatus being capable of suppressing a torsional vibration on a vehicle drive system, which is liable to be generated when an operation amount of an acceleration operating member sharply decreases during the drive with a gear position at a lower speed range being selected.

The vehicular power transmission control apparatus according to the present invention includes a multiple gear ratio transmission (T/M), a clutch (C/T), and a control unit (ECU, ACT1, and ACT2).

The multiple gear ratio transmission includes an input shaft (A2) to which power is inputted from an output shaft (A1) of the internal combustion engine, and an output shaft (A3) from which the power is outputted to a drive wheel of the vehicle.

The multiple gear ratio transmission includes predetermined plural gear positions, each of which has a different speed reducing ratio (a ratio of the revolution speed (Ni) of the input shaft to the revolution speed (Ne) of the output shaft).

The multiple gear ratio transmission does not include a torque converter. When the vehicle drives in the state in which the gear position of the multiple gear ratio transmission is set to "the gear position at the higher speed range having the speed reducing ratio smaller than that of a specific gear position at the lower speed range" other than the "specific gear position at the lower speed range", the control unit controls the clutch to be in the total engagement state having no slip through the control of the clutch torque of the clutch in order that the revolution speed (Ni) of the input shaft of the multiple gear ratio transmission agrees with the revolution speed (Ne) of the output shaft of the internal combustion engine. The "specific gear position at the lower speed range" means some gear positions of the plural gear positions, and indicates one or more gear positions at the lower speed range including the gear position having the greatest speed reducing ratio. Typically, "only a first speed" or "first speed and a second speed" can be employed as the "specific gear position at the lower speed range".

The feature of the power transmission control apparatus is as stated below. Specifically, when the vehicle drives with the state in which the gear position of the multiple gear ratio transmission is set to the "specific gear position at the lower speed range", the control unit always controls the clutch torque of the clutch in order that the revolution speed (Ni) of the input shaft of the multiple gear ratio transmission becomes smaller than the revolution speed (Ne) of the output shaft of the internal combustion engine by a positive predetermined value (A), so as to always control the clutch to be in a semi-engagement state having the slip. In particular, it is preferable that the control unit controls the clutch to be in the semi-engagement state, when (or only when) the vehicle drives with the state in which the gear position of the multiple gear ratio transmission is set to the "specific gear position at the lower speed range" and the operation amount of the acceleration operating member is zero. When the acceleration operating member is operated with this state, the clutch may be kept to be in the semi-engagement state, or the clutch may be changed from the semi-engagement state to the total engagement state.

In this case, the predetermined value (>0) may be a fixed value, or a value that is changed according to the driving condition of the vehicle. The phrase of "always controls" means the case excluding the period during the execution of the above-mentioned "shift operation", and the period during the execution of "the control (starting control) of gradually increasing the clutch torque with the clutch being kept to be in the semi-engagement state for starting the vehicle". Specifically, after the completion of the starting control, when the vehicle drives with the state in which the gear position is fixed to the "specific gear position at the lower speed range" (e.g., first speed or second speed), the clutch torque of the clutch is controlled in order that the revolution speed (Ni) of the input shaft of the multiple gear ratio transmission becomes smaller than the revolution speed (Ne) of the output shaft of the internal combustion engine by the positive predetermined value (A), except for the period during the execution of the shift operation.

When the acceleration pedal opening degree sharply decreases (particularly, to zero) from the great value in case where the vehicle drives with the state in which the gear position is fixed to the "specific gear position at the lower speed range", the torsional vibration is liable to generate on the vehicle drive system afterward. When the clutch is kept to be in the totally engagement state in this case, the action (damping action) of suppressing the torsional vibration with the slip on the clutch is not exerted. On the other hand, when the clutch is kept to be in the semi-engagement state as in the configuration described above, the "damping action due to the slip on the clutch" described above is exerted to the torsional vibration. Accordingly, the torsional vibration on the vehicle drive system can be suppressed, whereby the torsional vibration having relatively great amplitude is difficult to occur.

In the power transmission control apparatus according to the present invention, it is preferable that, as the operation amount (acceleration pedal opening degree) of the acceleration operating member operated by a driver of the vehicle is greater, the predetermined value (A) is set to be smaller. When the vehicle drives with the state in which the clutch is kept to be in the semi-engagement state (when the clutch transmits the torque), heat is generated on the clutch due to the slip on the clutch. The amount of the generated heat increases, as the acceleration pedal opening degree increases, i.e., the torque transmitted by the clutch increases. Accordingly, when the acceleration pedal opening degree is great, some countermeasure is to be preferably taken in order to suppress the excessively increased temperature of the clutch. On the other hand, the amount of the generated heat decreases, as the slip amount of the clutch (corresponding to the predetermined value) is smaller.

The configuration described above is based upon the knowledge described above. According to the configuration described above, the slip amount of the clutch is decreased, when the acceleration pedal opening degree is great. Accordingly, the amount of the generated heat is reduced, which prevents the clutch from having the excessive high temperature.

Similarly, it is preferable to configure the control unit to set the predetermined value to be a smaller value, as the time when the state, in which the gear position of the transmission is set to the specific gear position at the lower speed range, is continued becomes longer. The case where the state, in which the vehicle drives with the clutch being kept to be in the semi-engagement state (the clutch transmits the torque), is continued for a long time means that the state in which the heat is generated on the clutch is continued for a long time. Accordingly, when the state in which the gear position is set to the "specific gear position at the lower speed range" is continued for a long time, some countermeasure is to be preferably taken in order to suppress the excessively increased temperature of the clutch. The configuration described above is based upon the knowledge described above. According to the configuration described above, when the state in which the gear position is set to the "specific gear position at the lower speed range" is continued for a long time, the slip amount of the clutch is decreased. Consequently, the amount of the generated heat is reduced, which prevents the clutch from having the excessive high temperature.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which.

DESCRIPTION OF THE INVENTION

Figure 1:
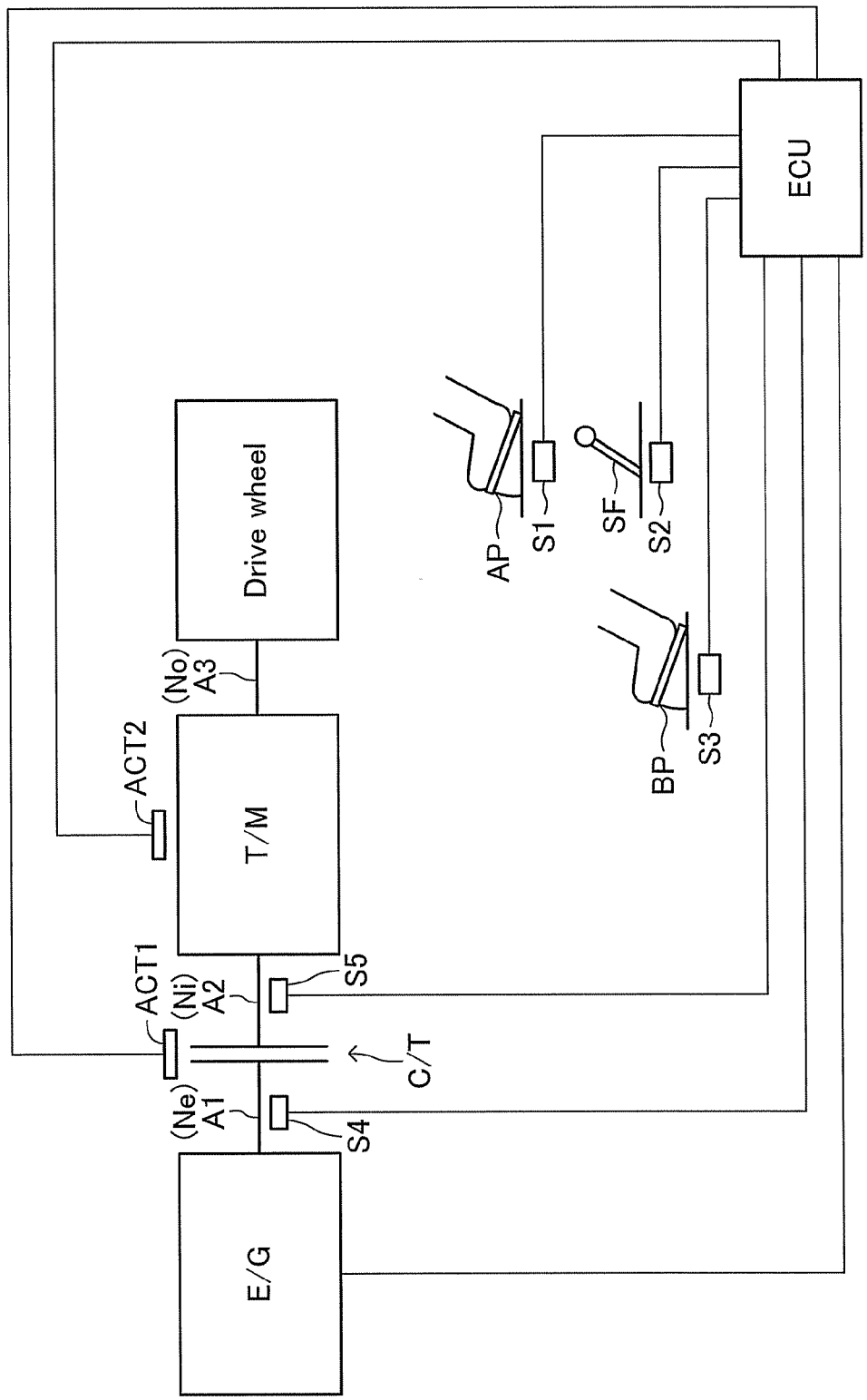
FIG. 1 is a schematic structural diagram illustrating a vehicle having mounted thereto a vehicular power transmission control apparatus according to an embodiment of the present invention.

Next will be described an embodiment of a vehicular power transmission control apparatus according to the present invention with reference to the drawings.
(Configuration)
FIG. 1 shows a schematic configuration of a vehicle having mounted thereto a vehicular power transmission control apparatus (hereinafter, referred to as a "present apparatus") according to an embodiment of the present invention. The vehicle includes, as its power sources, an internal combustion engine, and a so-called automated manual transmission, which uses a multiple gear ratio transmission and a clutch, but which does not have a torque converter.

The vehicle comprises the engine (E/G), the transmission (T/M), and a clutch (C/T). The E/G is one of well-known internal combustion engines, including a gasoline engine which uses a gasoline as a fuel and a diesel engine which uses a light diesel oil as a fuel. An output shaft A1 of the E/G is connected to an input shaft A2 of the T/M through the C/T.

The T/M is one of well-known multiple gear ratio transmissions. The T/M has a plurality of gear positions (e.g., five gear positions) as forward gear positions, one gear position as a reverse gear position, and a neutral gear position. The T/M does not comprise a torque converter. The output shaft A3 of the T/M is connected to a drive wheel of the vehicle through an unillustrated propeller shaft and an unillustrated differential. The T/M changes the gear position only by controlling a T/M actuator ACT2. When the gear position is changed, a speed reducing ratio (a ratio of a revolution speed Ni of the input shaft A2 to a revolution speed No of the output shaft A3) is changed.

The C/T comprises one of well-known structures and is configured so as to be capable of adjusting the maximum value (clutch torque Tc) of the torque that can be transmitted between the output shaft of the E/G and the input shaft of the TIM. Specifically, the C/T is a friction clutch disk, which is mounted to the input shaft A2 of the T/M so as to integrally rotate, and which has one of well-known structures. The clutch disk is arranged coaxially with a flywheel, which is mounted to the output shaft A1 of the E/G so as to integrally rotate, as being opposite to the flywheel. The position of the clutch disk in the axial direction with respect to the flywheel can be adjusted. The position of the C/T (specifically, the clutch disk) in the axial direction is adjusted by the clutch actuator ACT1.

Figure 2:
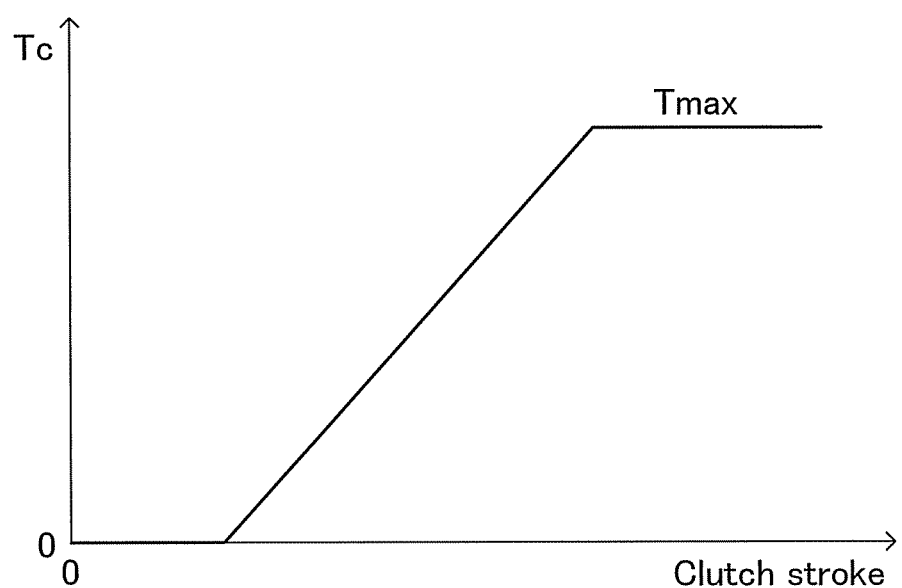
FIG. 2 is a graph illustrating a map specifying a "stroke-torque characteristic" for the clutch illustrated in FIG. 1.

The moving amount of the C/T (clutch disk) from the original position (the position where the clutch disk is farthest separated from the flywheel) toward an engaging direction (press-contact direction) in the axial direction is referred to as a clutch stroke. When the C/T is at the "original position", the clutch stroke becomes "0". As illustrated in FIG. 2, the clutch torque Tc is adjusted by adjusting the clutch stroke. With the state of "Tc=0", power is not transmitted between the output shaft A1 of the E/G and the input shaft A2 of the T/M. This state is referred to as a "disengagement state". With the state of "Tc>0", the power is transmitted between the output shaft A1 and the input shaft A2. This state is referred to as an "engagement state".

In the engagement state, the state in which a slip is not generated on the C/T (the state in which the revolution speed Ne of the output shaft A1 and the revolution speed Ni of the input shaft A2 agree with each other) is particularly referred to as a "total engagement state", while the state in which the slip is generated on the C/T (the state in which the Ne and the Ni do not agree with each other) is particularly referred to as a "semi-engagement state".

The present apparatus further comprises an acceleration pedal opening degree sensor S1 which detects an operation amount (acceleration pedal opening degree) of an acceleration pedal AP, a shift position sensor S2 which detects a position of a shift lever SF, a brake sensor S3 which detects whether a brake pedal BP is operated or not, a revolution speed sensor S5 which detects the revolution speed Ne of the output shaft Al, and a revolution speed sensor S5 which detects the revolution speed Ni of the input shaft A2.

The present apparatus further comprises an electronic control unit ECU. The ECU controls the actuators ACT1 and ACT2, based on information and so on from the sensors S1-S5 and the other sensors, to thereby control the clutch stroke (accordingly, clutch torque) of the C/T, and the gear position of the T/M. Further, the ECU controls the torque of the output shaft A1 of the E/G by controlling a fuel injection amount (opening degree of a throttle valve) of the E/G.

Specifically, the fuel injection amount (opening degree of the throttle valve) is controlled such that the drive torque of the E/G increases as the acceleration pedal opening degree increases.

When the shift lever SF is at the position corresponding to an "automatic mode", a gear position to be selected (selected gear position) is decided based upon a speed change map stored in a ROM (not illustrated) in the ECU and the information from the above-mentioned sensors. When the shift lever SF is at the position corresponding to a "manual mode", the selected gear position is decided based upon the operation on the shift lever SF by the driver. In the T/M, the gear position is determined at the selected gear position. When the vehicle drives with the gear position being determined (fixed) at the selected gear position, the clutch is adjusted to be in the total engagement state or in the semi-engagement state according to the selected gear position. This point will be described in detail later.

When the selected gear position is changed, the shift operation of the T/M (the operation when the gear position is changed) is performed. The start of the shift operation corresponds to the start of the movement of the member (specifically, a sleeve) that moves in relation to the change of the gear position, while the end of the shift operation corresponds to the end of the movement of the member. When the shift operation is performed, the C/T is changed from the engagement state (total engagement state or the semi-engagement state, the clutch torque Tc>0) to the disengagement state (clutch torque Tc=0) before the start of the shift operation, and with the clutch being kept to be in the disengagement state, the shift operation is performed. After the end of the shift operation, the clutch is returned to the engagement state (total engagement state or the semi-engagement state) from the disengagement state. As described above, the vehicle has mounted thereto the AMT.
(Control of Clutch Torque)

The control of the clutch torque in the present apparatus when the vehicle drives with the state in which the gear position is determined (fixed) at the selected gear position will be described below with reference to the flowchart in FIG. 3. It is to be noted that "the case where the vehicle drives with the state in which the gear position is determined (fixed)

at the selected gear position" does not include the period during the execution of the above-mentioned "shift operation" and the period during the execution of "the control (starting control) of gradually increasing the clutch torque with the clutch being kept to be in the semi-engagement state for starting the vehicle". Specifically, the control of the clutch torque described below is executed after the end of the starting control, and during when the "shift operation" is not executed.

Figure 3:
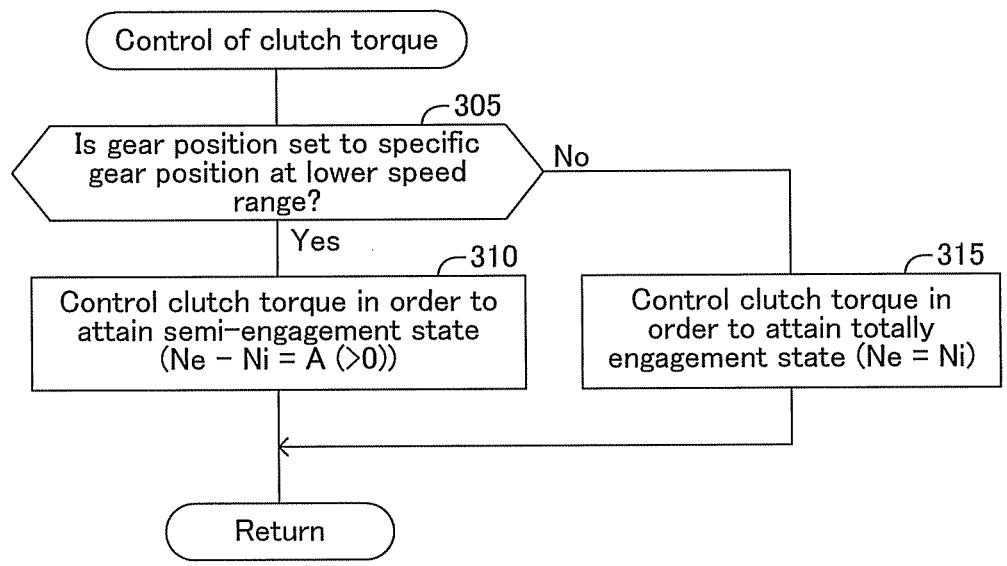
FIG. 3 is a flowchart illustrating an outline of a clutch torque control executed in the embodiment of the present invention.

As illustrated in FIG. 3, it is determined in step S305 whether the gear position is determined (fixed) at the "specific gear position at the lower speed range" or not. The "specific gear position at the lower speed range" indicates some gear positions of plural gear positions (five gear positions in the present embodiment) in the T/M, i.e., indicates one or more gear positions at the lower speed range including a first speed. In the present embodiment, "only the first speed" or "first speed and a second speed" are employed as the "specific gear position at the lower speed range", for example.

When the "specific gear position at the lower speed range" is determined ("Yes in step S305), the clutch torque Tc is controlled in step 310 such that the difference (Ne−Ni) in the revolution speed, which difference is obtained by subtracting the revolution speed Ni of the input shaft A2 from the revolution speed Ne of the output shaft A1, always becomes a predetermined value A (>0). Specifically, when the difference in the revolution speed (Ne−Ni) is greater than the predetermined value A, the clutch torque Tc is increased, while the clutch torque Tc is decreased, when the difference in the revolution speed (Ne−Ni) is less than the predetermined value A. As described above, the C/T is always controlled to be in the semi-engagement state, when the "specific gear position at the lower speed range" is determined. It may be configured such that the clutch is in the semi-engagement state, when (or only when) the "specific gear position at the lower speed range" is determined, and the acceleration pedal opening degree Accp is kept to be zero. When the acceleration pedal opening degree Accp becomes greater than zero (when the operation on the acceleration pedal AP is started) with this state, the C/T may be kept to be in the semi-engagement state, or the C/T may be changed from the semi-engagement state to the total engagement state.

On the other hand, when the "specific gear position at the lower speed range" is not determined ("No" in step 305), i.e., when the gear position at the higher speed range than the "specific gear position at the lower speed range" is determined, the clutch torque Tc is controlled so as to establish Ne=Ni. Specifically, the clutch torque Tc is controlled to become greater than the drive torque exerted on the output shaft A1 of the E/G (e.g., controlled to be constant at the maximum value Tmax (see FIG.2)). As described above, the C/T is controlled to be in the total engagement state, when the gear position at the higher speed range than the "specific gear position at the lower speed range" is determined.

As described above, the C/T is adjusted to be in the total engagement state or in the semi-engagement state according to the selected gear position. The reason why the C/T is controlled to be in the total engagement state when the gear position at the higher speed range than the "specific gear position at the lower speed range" is determined is because the progression of the abrasion of the C/T (clutch disk) and the reduction in the power transmission efficiency, which are caused by the slip generated on the C/T, are suppressed.

The case where the C/T is always controlled to be in the semi-engagement state in case where the "specific gear position at the lower speed range" is determined will be described below. It is supposed below that the vehicle drives with the gear position being determined (fixed) at the "specific gear position at the lower speed range" (e.g., first speed) after the completion of the starting control described above.

One example of the operation when a comparative example of the present apparatus is employed will firstly be described with reference to FIG. 4. In the example in FIG. 4, when the "specific gear at the lower speed range" is determined, the clutch torque Tc is controlled to be fixed at a value T1 (e.g., the maximum value Tmax illustrated in FIG. 2) so as to keep the total engagement state (Ne=Ni) as in the case where the gear position at the higher speed range than the "specific gear position at the lower speed range" is determined.

Figure 4:
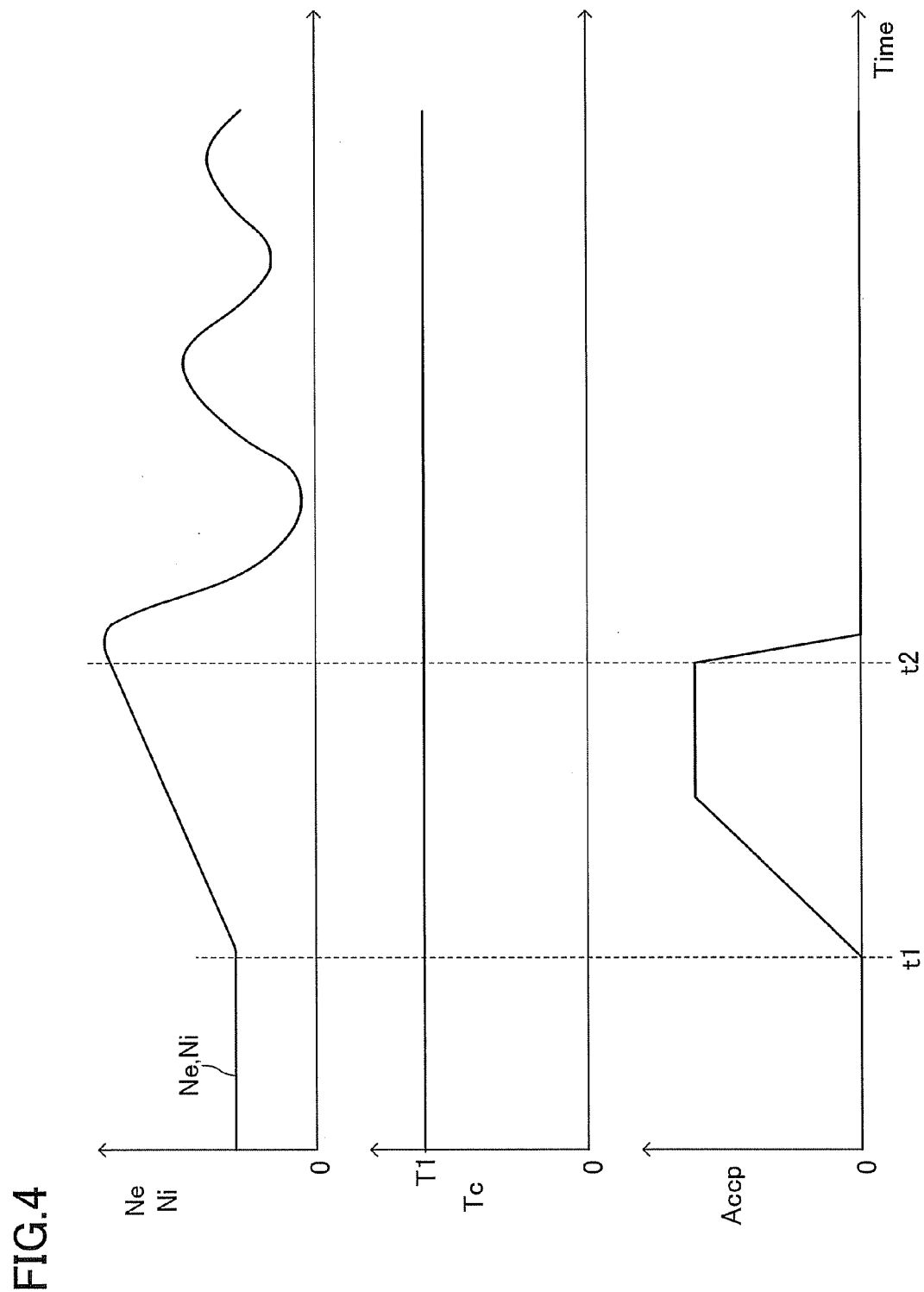
FIG. 4 is a time chart illustrating one example of a torsional vibration that is generated on a drive system when an acceleration pedal opening degree sharply decreases from a great value during a drive with a specific gear position at a lower speed range, in case where a comparative example in the embodiment of the present invention is employed.

In the example in FIG. 4, the acceleration pedal opening degree Accp is kept to be zero before a time t1, increases to a great predetermined value from zero after the time t1, and sharply decreases to zero from the great value after a time t2.

In the example in FIG. 4, a great variation is generated on the revolution speed Ne (=Ni) after the time t2 when the acceleration pedal opening degree Accp sharply decreases from the great value to zero. In other words, a torsional vibration having relatively large amplitude is generated on the vehicle drive system. This is considered to be based upon the reason stated below.

Specifically, when the "specific gear position at the lower speed range" having a large speed reducing ratio is determined, the drive torque of the E/G inputted to the input shaft A2 of the T/M through the C/T is greatly amplified in the T/M before being, transmitted to the output shaft A3 of the T/M. Accordingly, a large drive torque is exerted on "the drive system between the output shaft A3 of the T/M and the drive wheel" immediately before the time t2 when the acceleration pedal opening degree Accp (accordingly, the drive torque of the EIG) is adjusted to be the great value. Specifically, a great torsion is generated on the propeller shaft or the like constituting the "drive system between the output shaft A3 and the drive wheel".

When the acceleration pedal opening degree Accp sharply decreases at the time t2 with this state, the drive torque of the E/G sharply decreases. Therefore, the drive torque inputted to the input shaft A2 of the T/M via the C/T also sharply decreases. With this, the drive torque exerted on "the drive system between the output shaft A3 of the T/M and the drive wheel" also sharply decreases. As a result, the great torsion generated on the propeller shaft or the like is abruptly released. Due to the abrupt release of the "great torsion", the torsional vibration is liable to occur on the propeller shaft or the like afterward. When the torsional vibration occurs on the propeller shaft or the like as described above, the torsional vibration occurs on the vehicle drive system.

When the C/T is kept to be in the total engagement state (Ne=Ni) in the state in which the torsional vibration occurs on the drive system as described above, the slip is not generated on the C/T. Therefore, the action (damping action) of suppressing the torsional vibration by the slip on the C/T is not exerted. As a result, the great torsional vibration having relatively large amplitude is liable to occur on the vehicle drive system.

Figure 5:
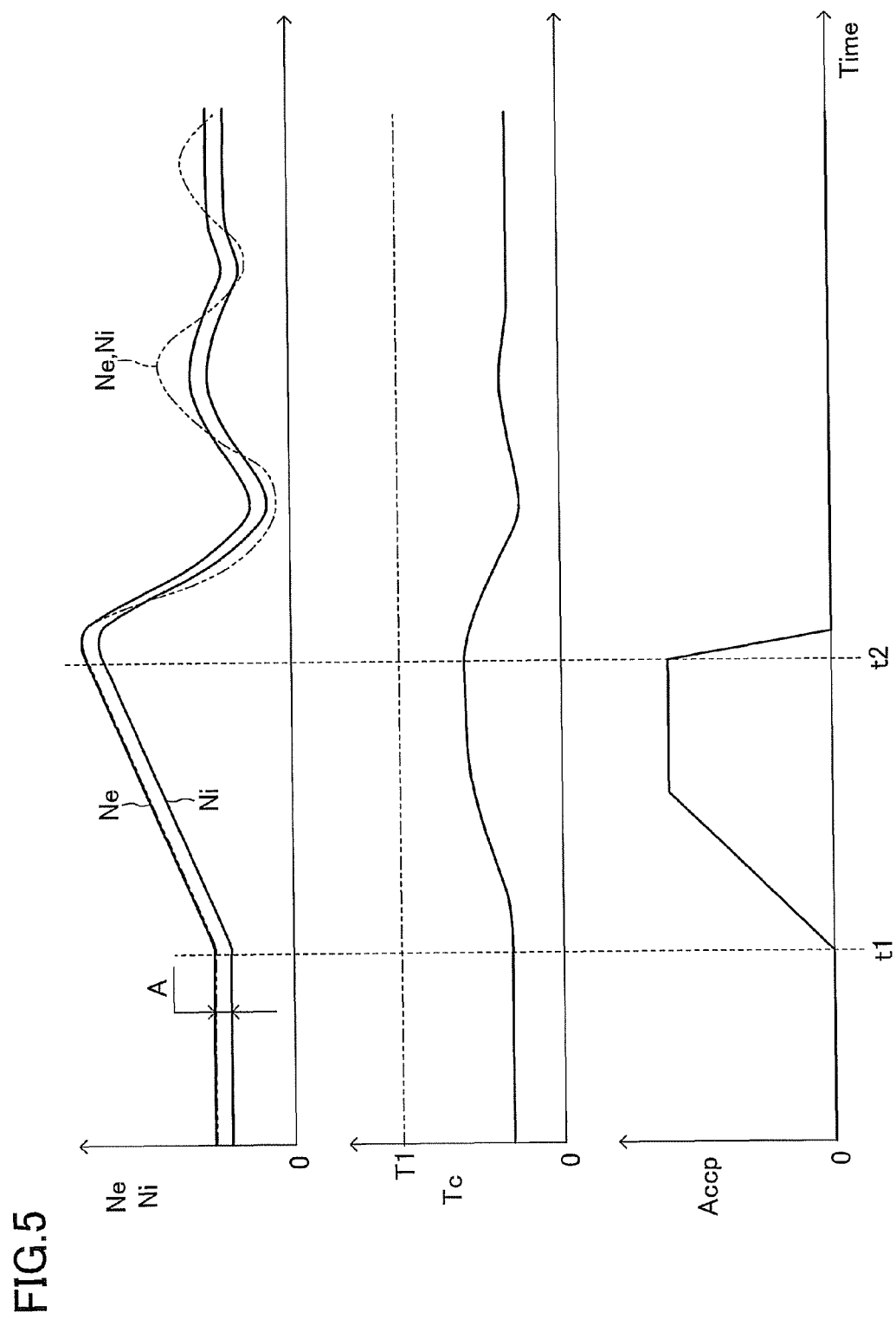
FIG. 5 is a time chart, corresponding to FIG. 4, illustrating one example of a torsional vibration that is generated on the drive system when the acceleration pedal opening degree sharply decreases from a great value during the drive with the specific gear position at the lower speed range, in case where the embodiment of the present invention is employed.

On the other hand, FIG. 5 corresponds to FIG. 4, and illustrates one example of an operation when the present apparatus is employed. The times t1 and t2 in FIG. 5 respectively correspond to the times t1 and t2 in FIG. 4. In FIG. 5, the transitions of the Ne, Ni, and Tc are indicated by small two-dot-chain lines.

In the example in FIG. 5, when the "specific gear position at the lower speed range" is determined, the clutch torque Tc is controlled so as to keep the semi-engagement state (Ne−Ni=A) (see step 310 in FIG. 3). When the semi-engagement state (Ne−Ni=A) is maintained, instead of the total engagement state (Ne=Ni), the aforesaid "damping action by the slip on the clutch" acts on the torsional vibration. As a result, after the time t2, the variation range of the revolution speed Ne (=Ni) decreases, compared to the case in FIG. 4. In other words, the torsional vibration on the vehicle drive system is suppressed, which makes it difficult to generate the torsional vibration having relatively large amplitude.

Figure 6:
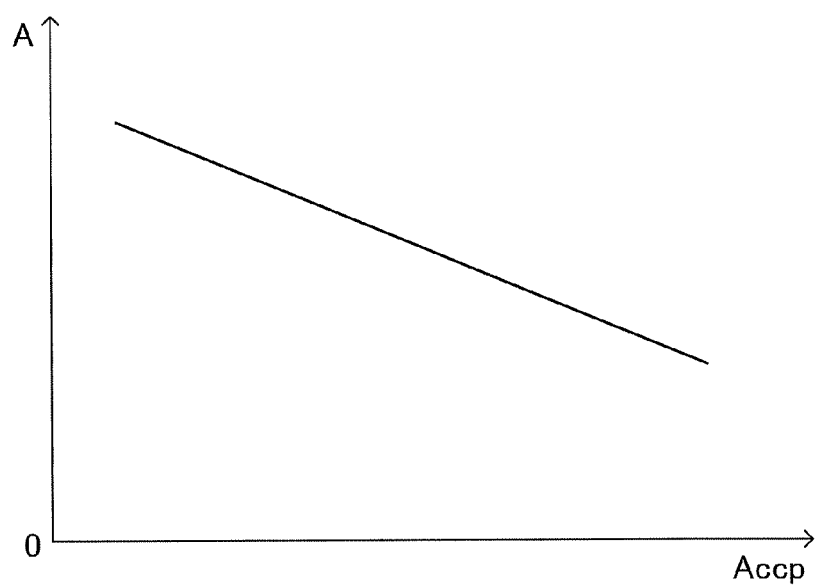
FIG. 6 is a graph illustrating one example of a relationship between the acceleration pedal opening degree and a predetermined value A, when the predetermined value A is adjusted with respect to the acceleration pedal opening degree according to the embodiment of the present invention.

The value A may be constant, or may be different according to the vehicle driving condition. Specifically, as illustrated in FIG. 6, the value A may be set to be smaller, as the acceleration pedal opening degree Accp becomes greater. This configuration is based upon the reason stated below. Specifically, when the vehicle drives with the C/T being kept to be in the semi-engagement state, heat is generated on the C/T because of the slip on the C/T. The amount of the generated heat becomes greater, as the acceleration pedal opening degree Accp becomes greater. Accordingly, when the acceleration pedal opening degree Accp is great, it is necessary to reduce the amount of the generated heat in order to prevent the C/T from having an excessively high temperature.

The amount of the generated heat becomes smaller, as the slip amount (corresponding to the A) of the C/T becomes smaller. From the above, when the acceleration pedal opening degree Accp is great, it is preferable to decrease the slip amount of the C/T. The configuration described above is based upon the knowledge stated above. Thus, this configuration can prevent the clutch from having excessively high temperature, when the acceleration pedal opening degree is great. Specifically, in the example in FIG. 5, the value A is kept to constant during when the acceleration pedal opening degree Accp is kept as zero after the time t2, and when the acceleration pedal opening degree Accp becomes greater than zero afterward, the value A can be set to be smaller, as the acceleration pedal opening degree Accp becomes greater.

Figure 7:
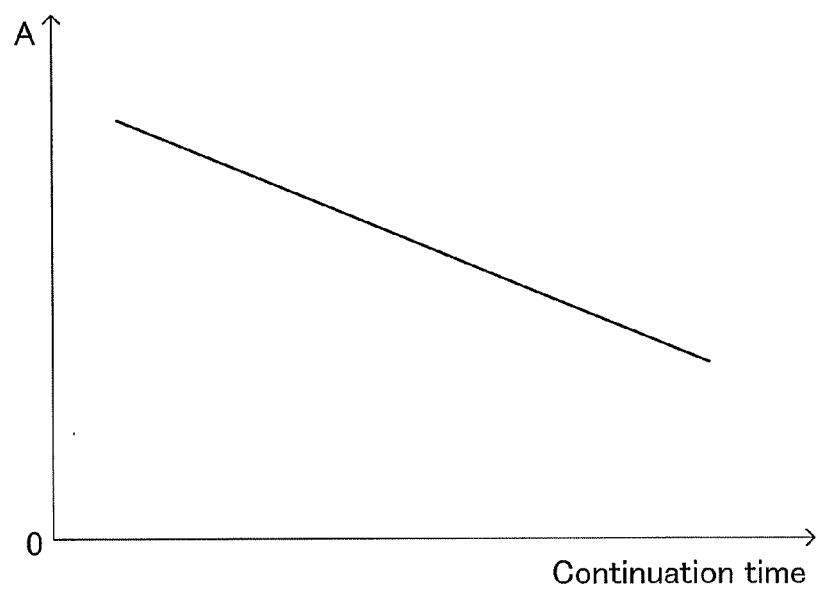
FIG. 7 is a graph illustrating one example of a relationship between a "continuation time" and the predetermined value A when the predetermined value A is adjusted with respect to the "continuation time of the state in which the specific gear position at the lower speed range is selected" according to the embodiment of the present invention.

As illustrated in FIG. 7, as the time (hereinafter referred to as a "continuation time") when the state, in which "the specific gear position at the lower speed range" is determined, is continued, i.e., the time when the semi-engagement state (Ne−Ni=A) is continued, becomes longer, the value A may be set to be smaller. This configuration is based upon the reason stated below. The case where the continuation time becomes long means that the state in which the heat is generated on the clutch is continued for a long time. Accordingly, when the continuation time becomes longer, some countermeasure is to be preferably taken in order to suppress the excessively increased temperature of the clutch. From the above, when the continuation time becomes longer, it is preferable to reduce the slip amount on the C/T. The above-mentioned configuration is based upon the knowledge described above. Thus, this can prevent the clutch from having excessively high temperature, when the continuation time becomes longer. Specifically, in the example in FIG. 5, the value A can be set to be smaller, as the continuation time of the state in which the acceleration pedal opening degree Accp is kept to be zero after the time t2 becomes longer.

The present invention is not limited to the above-mentioned embodiment, and various modifications are possible without departing from the scope of the present invention. For example, the above-mentioned embodiment employs the power transmission control apparatus including the transmission having a single input shaft, and a single clutch connected to the single input shaft. However, a power transmission control apparatus may be employed, which includes a transmission having two input shafts, and two clutches respectively connected to two input shafts. This apparatus is called a double clutch transmission (DCT).

What is claimed is:

1. A vehicular power transmission control apparatus comprising:
   a multiple gear ratio transmission including an input shaft to which power is inputted from an output shaft of an internal combustion engine, and an output shaft from which the power is outputted to a drive wheel of a vehicle, and includes a plurality of gear positions, each of which has a different speed reducing ratio that is a ratio of a revolution speed of the input shaft to a revolution speed of the output shaft of the multiple gear ratio transmission;
   a clutch that is mounted directly between the output shaft of the internal combustion engine and the input shaft of the multiple gear ratio transmission, and that can adjust a clutch torque, which is a maximum torque that the clutch can transmit; and
   a control unit that controls the clutch torque of the clutch and a gear position of the multiple gear ratio transmission based upon a driving condition of the vehicle,
   wherein
   the control unit controls the clutch torque of the clutch such that a revolution speed of the input shaft of the multiple gear ratio transmission becomes smaller than a revolution speed of the output shaft of the internal combustion engine by a predetermined positive value in a semi-engagement state with a slip, when the vehicle drives with the gear position of the multiple gear ratio transmission set to a low speed range comprises at least a gear position having a greatest speed reducing ratio, while the control unit controls the clutch torque of the clutch such that the revolution speed of the input shaft of the multiple gear ratio transmission is equal to the revolution speed of the output shaft of the internal combustion engine in a total engagement state without the slip, when the vehicle drives with the gear position of the multiple gear ratio transmission set to a gear position other than the low speed range and which has a speed reducing ratio smaller than that of the gear positions in the low speed range,
   wherein when the transmission is set to the lowest speed range and the drive torque of the engine sharply decreases, to suppress torsional vibration the clutch torque is controlled in a semi-engagement state in which when a difference in revolution speed, which is a difference obtained by subtracting the revolution speed Ni of the input shaft of the transmission from the revolution speed Ne of the output shaft of the internal combustion engine, is greater than a predetermined value A, the clutch torque is increased, and when the difference in revolution speed is less than the predetermined value A, the clutch torque is decreased.

2. A vehicular power transmission control apparatus according to claim 1, wherein the control unit is configured to reduce the predetermined positive value set in the semi-engagement state when an operation amount of an acceleration operating member operated by a driver of the vehicle becomes greater.

3. A vehicular power transmission control apparatus according to claim 2, wherein the control unit is configured to reduce the predetermined positive value set in the semi-engagement state, as a time that the gear position of the multiple gear ratio transmission is set in the low speed range becomes longer.

4. A vehicular power transmission control apparatus according to claim 2, wherein the control unit is configured to control the clutch torque such that the revolution speed of the input shaft of the multiple gear ratio transmission becomes smaller than the revolution speed of the output shaft of the internal combustion engine by the predetermined positive valuein the semi-engagement state, when the vehicle drives with the gear position of the multiple gear ratio transmission set in the low speed range, and the operation amount of the acceleration operating member operated by the driver of the vehicle is zero.

5. A vehicular power transmission control apparatus according to claim 1, wherein the control unit is configured to reduce the predetermined positive value set in the semi-engagement state as a time that the gear position of the multiple gear ratio transmission is set in the low speed range becomes longer.

6. A vehicular power transmission control apparatus according to claim 5, wherein the control unit is configured to control the clutch torque such that the revolution speed of the input shaft of the multiple gear ratio transmission becomes smaller than the revolution speed of the output shaft of the internal combustion engine by the predetermined positive value in the semi-engagement state, when the vehicle drives with the gear position of the multiple gear ratio transmission set in the low speed range, and the operation amount of the acceleration operating member operated by the driver of the vehicle is zero.

7. A vehicular power transmission control apparatus according to claim 1, wherein the control unit is configured to control the clutch torque such that the revolution speed of the input shaft of the multiple gear ratio transmission becomes smaller than the revolution speed of the output shaft of the internal combustion engine by the predetermined positive value in the semi-engagement state, when the vehicle drives with the gear position of the multiple gear ratio transmission set in the low speed range, and the operation amount of the acceleration operating member operated by the driver of the vehicle is zero.

8. The vehicular power transmission control apparatus according to claim 1, wherein the low speed range comprises the first gear position only.

9. A vehicular power transmission control apparatus comprising:
a multiple gear ratio transmission including an input shaft to which power is inputted from an output shaft of an internal combustion engine, and an output shaft from which the power is outputted to a drive wheel of a vehicle, and includes a plurality of gear positions, each of which has a different speed reducing ratio that is a ratio of a revolution speed of the input shaft to a revolution speed of the output shaft of the multiple gear ratio transmission;
a clutch that is mounted directly between the output shaft of the internal combustion engine and the input shaft of the multiple gear ratio transmission, and that can adjust a clutch torque, which is a maximum torque that the clutch can transmit; and
a control unit that controls the clutch torque of the clutch and a gear position of the multiple gear ratio transmission based upon a driving condition of the vehicle, wherein
the control unit controls the clutch torque of the clutch such that a revolution speed of the input shaft of the multiple gear ratio transmission becomes smaller than a revolution speed of the output shaft of the internal combustion engine by a predetermined positive value in a semi-engagement state with a slip, when the vehicle drives with the gear position of the multiple gear ratio transmission set to a low speed range comprises at least a gear position having a greatest speed reducing ratio, while the control unit controls the clutch torque of the clutch such that the revolution speed of the input shaft of the multiple gear ratio transmission is equal to the revolution speed of the output shaft of the internal combustion engine in a total engagement state without the slip, when the vehicle drives with the gear position of the multiple gear ratio transmission set to a gear position other than the low speed range and which has a speed reducing ratio smaller than that of the gear positions in the low speed range,
wherein in a case where an amount of an acceleration operating member operated by the driver of the vehicle sharply decreases from a value greater than zero to zero with the transmission set to the low speed range, when a difference in revolution speed, which is a difference obtained by subtracting the revolution speed Ni of the input shaft of the transmission from the revolution speed Ne of the output shaft of the internal combustion engine, is greater than a predetermined value A, the clutch torque is increased, and when the difference in revolution speed is less than the predetermined value A, the clutch torque is decreased.

* * * * *